United States Patent [19]
Cheng et al.

[11] Patent Number: 6,134,360
[45] Date of Patent: Oct. 17, 2000

[54] OPTICAL FIBRE SLEEVE

[75] Inventors: Yihao Cheng, Kanata; Neil Teitelbaum, Ottawa; Jozef Finak, Kanata, all of Canada

[73] Assignee: JDS Uniphase Inc., Ottawa

[21] Appl. No.: 09/110,389

[22] Filed: Jul. 7, 1998

[51] Int. Cl.⁷ .............................. G02B 6/44; G02B 6/26
[52] U.S. Cl. .............................. 385/39; 385/46; 385/52; 385/102
[58] Field of Search .................... 385/39, 43, 50, 385/51, 52, 102, 45, 46, 96, 97, 98; 359/30

[56] References Cited

U.S. PATENT DOCUMENTS

| | | | |
|---|---|---|---|
| 4,564,262 | 1/1986 | Shaw | 385/30 |
| 4,671,611 | 6/1987 | Allemand et al. | 385/107 |
| 4,740,053 | 4/1988 | Cassidy | 385/102 |
| 4,773,924 | 9/1988 | Berkey | 385/43 |
| 4,923,268 | 5/1990 | Xu | 385/50 |
| 5,136,683 | 8/1992 | Aoki et al. | 385/141 |
| 5,353,365 | 10/1994 | Dumas et al. | 385/102 |
| 5,448,673 | 9/1995 | Murphy et al. | 385/123 |
| 5,553,179 | 9/1996 | Cryan et al. | 385/43 |
| 5,594,822 | 1/1997 | Berkey | 385/43 |
| 5,734,767 | 3/1998 | Belt | 385/51 |

*Primary Examiner*—Jon Henry
*Attorney, Agent, or Firm*—Neil Teitelbaum

[57] ABSTRACT

A sleeve for retaining a plurality of optical fibers in a close or contacting relationship is provided. The sleeve has a bore receiving a number of optical fibers. The internal surface of the bore is such that when that number of optical fibers are contained therein the bore surface defines a perimeter substantially equally spaced about the external surfaces of the optical fibers. Advantageously the sleeve of the present invention may be sealed about the plurality of fibers by vitrification or adhesive to support the fibers or fiber ends without causing unequally distributed stress in the fibers. Signal quality is thus better assured.

8 Claims, 5 Drawing Sheets

OPTICAL FIBRE SLEEVE

FIELD OF THE INVENTION

This invention relates to a sleeve for retaining a plurality of optical fibers. More particularly, the invention relates to a sleeve for retaining the plurality of fibers, which minimizes and equalizes stress distribution within the fibers.

BACKGROUND OF THE INVENTION

Optical fibers are used in a wide variety of applications ranging from telecommunications to medical technology and optical components. Because of their unique structure, optical fibers are capable of highly accurate transmission of light, which is relatively unaffected by interference, diffusion, and other signal de-enhancing phenomena. However, for optical fibers to function at their optimum potential they must be structurally intact and free of scratches, cracks, leaks, or substantially unequal distributed stress.

Optical fibers consist of a core material that is surrounded by a cladding. The difference between the indexes of refraction of the core and cladding materials (which, in some cases, are simply different types of fused silica glass) allows the optical fiber to function. Most commercially available optical fibers, in addition, have an external "buffer or jacket". The jacket is a thin coating (usually plastic, other polymer, or metal) which is applied to the fiber to protect it from being scratched during handling and to limit the amount of water that can come into contact with the fiber. Scratching or contact with water or moisture can deleteriously affect both the optical properties and the strength of the glass fiber. In addition to shielding the fiber's surface, the buffer also operates to help maintain the high tensile strength and the bending capability of the glass optical fibers. A number of fiber optic applications require that one terminus of the fiber be located in an environment isolated from the other terminus. This implies the use of a connector, coupling device, or "feed through" which serves as the point of communication between the distinct environments. Oftentimes, it is necessary or desirable for the point of communication between the environments to be completely sealed except for the presence of the optical fiber. Herein arises the need for a satisfactory method to hermetically seal optical fibers. Further it is desired to provide support for fiber ends to be joined or coupled. Sleeves may also be used to align and support a plurality of fibers. Methods are known for placing and affixing optical fibers in sleeves of different types for the purposes of providing a protective sheath for reducing damage to optical fibers that would otherwise be exposed, and for attempting to provide a housing for optical fibers. In many of these applications an adhesive such as epoxy is placed in the sleeve with the optical fiber to provide a bonded seal between the fiber and the sleeve.

In one U.S. Pat. No. 5,734,767 issued Mar. 31, 1998 in the name of Belt a method of making a hermetically sealed fiber optic coupler comprises at least one optical fiber and a tubular sleeve. The fibers are inserted into the tube and the empty space is filled with an adhesive.

In another U.S. Pat. No. 5,594,822 issued Jan. 14, 1997 in the name of Berkey a method of making a fiber optic coupler comprises a plurality of optical fibers and a sleeve having a circular bore. The fibers are inserted into the tube and the sleeve is then collapsed onto the fibers.

In yet another U.S. Pat. No. 5,754,720 issued May 19, 1998 in the names of Quinn, Robson, Swaroop, Weidman spacer fibers are used to prevent the active optical fibers from sagging or crossing over during the process of collapsing the sleeve onto the fibers. In all these methods, when applied to a plurality of optical fibers, the optical fibers are exposed to substantially unequal distributed stress significantly distorting an optical signal transmitted through the optical fibers.

Therefore, it is an object of this invention to provide a sleeve for retaining a plurality of optical fibers minimizing unequal distributed stress often associated with placing a plurality of optical fibers within a sleeve or ferrule.

SUMMARY OF THE INVENTION

In accordance with the invention, a sleeve is provided, having a bore for retaining a plurality of optical fibers, the bore cross section comprising at least two portions each having a circular cross section each circular cross section having a diameter that is less than the combined diameters of two fibers of the plurality of fibers the bore has to accommodate.

In accordance with the invention, a sleeve is provided, having a bore defined by one or more inner walls for retaining a plurality of contacting optical fibers held in place by an adhesive material, such that at least a portion of the bore for containing the adhesive material conforms to an external surface of the plurality of contacting optical fibers when contained within the sleeve.

In accordance with another aspect of the invention, a sleeve is provided having a bore defined by one or more inner walls for retaining a plurality of optical fibers, such that a cross-section through the sleeve perpendicular to a longitudinal axis thereof substantially conforms to a cross-section through the plurality of optical fibers when inserted within the sleeve.

Advantageously, the present invention provides a sleeve with a bore that closely matches the shape of the fibers so that hermetic sealing or vitrifying techniques causes minimal stress within the fibers.

BRIEF DESCRIPTION OF THE DRAWINGS

Exemplary embodiments of the invention will now be described in conjunction with the attached drawings, in which:

FIG. 1b schematically shows a stress distribution of the upper optical fiber shown in FIG. 1a;

FIG. 6b schematically shows a stress distribution of the upper optical fiber shown in FIG. 6a;

FIG. 7b shows a stress distribution of the upper optical fiber shown in FIG. 7a;

DETAILED DESCRIPTION

Figure 1B:
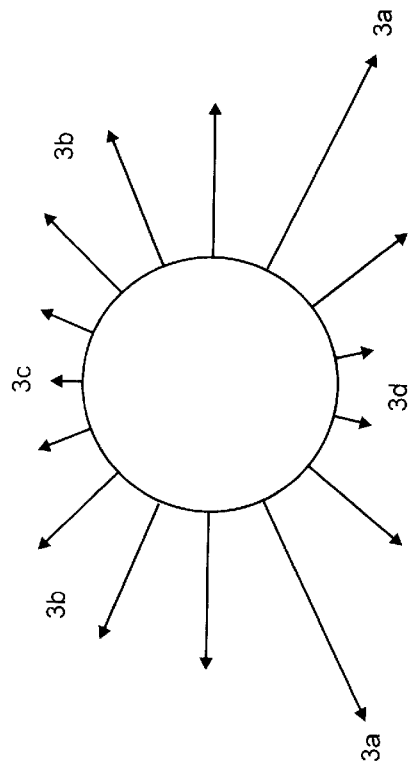
Figure 1D:
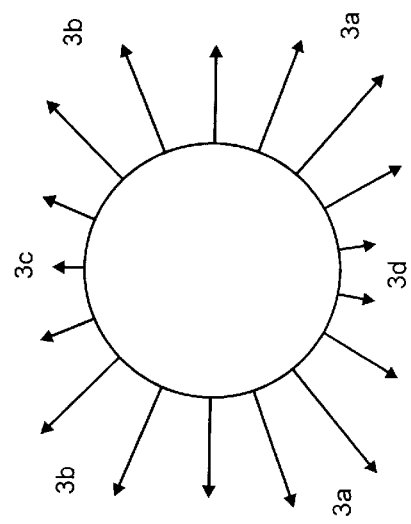
FIG. 1d schematically shows a stress distribution of the upper optical fiber shown in FIG. 1c.
Figure 1A:
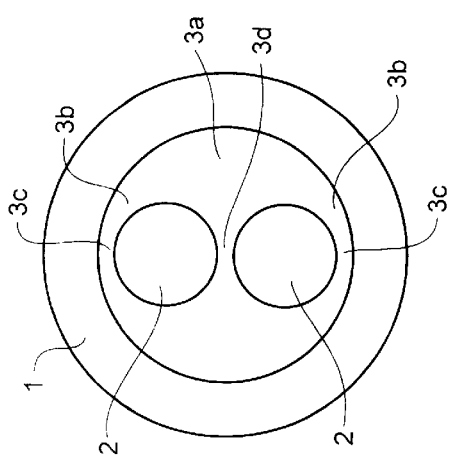
FIG. 1a shows an end view of a sleeve according to the prior art having a bore with a circular cross section for retaining a pair of optical fibers.

Referring to FIG. 1a, an end view of a sleeve 1 according to the prior art is shown. The sleeve has a bore with a circular cross section and retains a pair of optical fibers 2. Once the optical fibers are inserted an adhesive such as epoxy, glue, resin, glass solder, metal solder etc. is added, at the location 3a a large amount, at the location 3b a smaller amount and at the location 3c a small amount of adhesive. Alternatively, the adhesive can be applied directly to the optical fibers prior to their insertion into the sleeve 1. During the process of drying, the volume of the adhesive shrinks. The shrinkage of the adhesive is proportional to its volume, i.e. at locations with a large amount of adhesive the shrinkage is large, at locations with a small amount of adhesive the shrinkage is small. This shrinkage of the adhesive causes stress, proportional to the magnitude of the shrinkage, acting on the surface of the optical fibers. The arrows in FIG. 1b indicate the stress acting on the surface of the upper optical fiber shown in FIG. 1a. The direction of the arrows indicates the direction of the stress and the length of the arrows is a measure for the magnitude of the stress. At the location 3a, being an area with a large amount of adhesive, the arrow indicates a large tensile stress acting on the surface of the optical fiber. Proceeding through location 3b to location 3c the length of the arrows is decreasing, i. e. the magnitude of the tensile stress is decreasing due to the smaller amount of adhesive. Proceeding from location 3a to location 3d, where the surfaces of the two optical fibers are very close to each other, the magnitude of the tensile stress is decreasing and is approximately zero at the location 3d. This unequal distribution of stresses acting on the surface of the optical fibers induces substantially unequal distributed stresses within the optical fibers causing interference, dispersion, diffusion and other signal de-enhancing phenomena affecting the accurate transmission of light through the optical fibers. The large volume at location 3a also allows the optical fibers during the drying process of the adhesive to sag or to cross over.

Figure 1C:
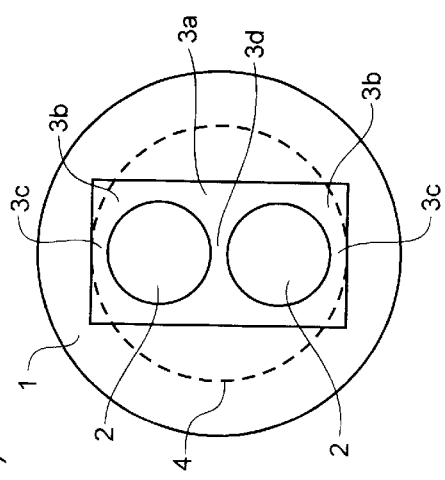
FIG. 1c shows an end view of a sleeve according to the prior art having a bore with a rectangular cross section for retaining a pair of optical fibers.

Referring to FIG. 1c, another embodiment according to the prior art is shown. To overcome the problem of sagging or crossing over of the optical fibers and the problem of substantially unequal distributed stress the sleeve shown in FIG. 1c comprises a bore with a rectangular cross section. Compared with the sleeve having a bore with circular cross section, indicated by the dashed line 4, the use of a bore with rectangular cross section shows improvement to some extent. Obviously, the large volume of adhesive at location 3a is reduced, but the rectangular cross section increases the volume of adhesive at location 3b. FIG. 1d shows the distribution of the stresses acting on the surface of the upper optical fiber shown in FIG. 1c. At the location 3a the tensile stress is to some extent smaller due to the smaller amount of adhesive there. Proceeding from location 3a through location 3b to location 3c the magnitude of the tensile stress is first decreasing then at location 3b increasing due to the larger amount of adhesive in the corner of the rectangle and finally decreasing towards location 3c. Proceeding from location 3a to location 3d, where the surfaces of the two optical fibers are very close to each other, the magnitude of the tensile stress is decreasing and is approximately zero at the location 3d. The use of a sleeve having a bore with a rectangular cross section as shown in FIG. 1c eliminates the problem of sagging or crossing over of the optical fibers. But examining the distribution of the stresses acting on the surfaces of the optical fibers, as shown in FIG. 1d, clearly indicates that there is still substantially unequally distributed tensile stress acting on the surfaces of the optical fibers.

Figure 2B:
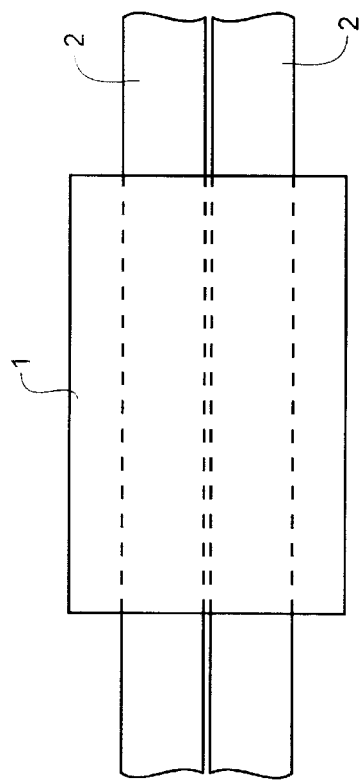
FIG. 2b shows a side view of a sleeve according to the invention retaining two optical fibers.
Figure 2D:
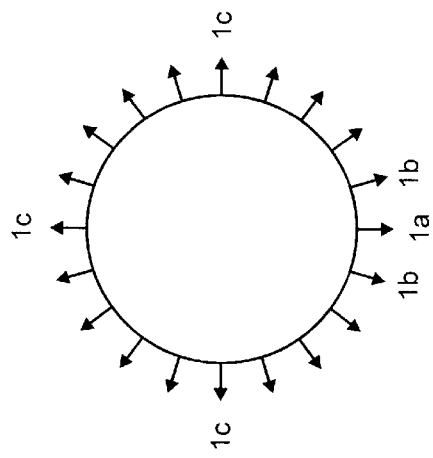
FIG. 2d schematically shows a stress distribution of the upper optical fiber shown in FIG. 2c.
Figure 2A:
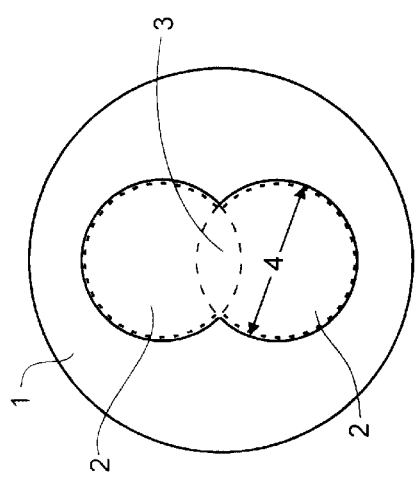
FIG. 2a shows an end view of a sleeve according to the invention for retaining two optical fibers.
Figure 2C:
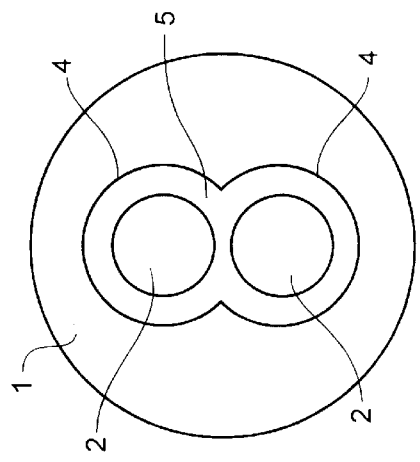
FIG. 2c shows an end view of a sleeve according to the invention retaining two optical fibers.

Referring to FIG. 2a, a sleeve 1 according to the invention for retaining a plurality in the form of two optical fibers 2 is shown. The bore of the sleeve 1 has a cross section comprising two portions 2 with a circular cross section as indicated by the dashed lines. The diameter 4 of each cross section is less than the combined diameters of the two fibers the bore has to accommodate. The two cross sections may overlap as indicated by the area 3. FIG. 2b shows a side view of the sleeve 1 retaining two optical fibers 2. The end view in FIG. 2c shows the sleeve 1 retaining these optical fibers 2 and the inner walls 4 of the bore of the sleeve defining a perimeter substantially equally spaced about the external surface of the optical fibers. After inserting the optical fibers into the bore of the sleeve, each fiber fitting snugly in its position within the bore, the optical fibers are affixed using an adhesive. Capillary action ensures that the adhesive fills the empty space 5 between the optical fibers 2 and the inner walls 4 of the bore. During the drying process the inner surface of the bore retains the optical fibers in their position, thus preventing them from sagging or crossing over. In FIG. 2d the distribution of the stresses acting on the surface of the upper optical fiber in FIG. 2c is shown. At the location 1a where the surfaces of the optical fibers are very close to each other the magnitude of tensile stress acting on the surface of the optical fibers is approximately zero. At the locations 1b adjacent to location 1a the tensile stress is increasing in this area due to the increasing amount of adhesive material from location 1a of the optical fibers to a constant amount around the surface of the optical fibers at the locations 1c. Apart from the locations 1a and 1b FIG. 2d shows tensile stress of constant magnitude acting on the surface of the optical fiber. The smaller empty space 5 between the surface of the optical fibers and the surface of the bore contains less adhesive material, thus reducing the magnitude of tensile stress acting on the surface of the optical fibers. Therefore, the magnitude of the tensile stress is much smaller compared to the magnitude of tensile stress acting on the surface of the optical fibers shown in the embodiments according to the prior art, e.g. in FIG. 1b. The more equal distribution of tensile stress and the smaller magnitude of tensile stress acting on the surface of the optical fiber, as shown in FIG. 2d, reduces substantially the signal de-enhancing phenomena such as interference, diffusion, etc.

Figure 3B:
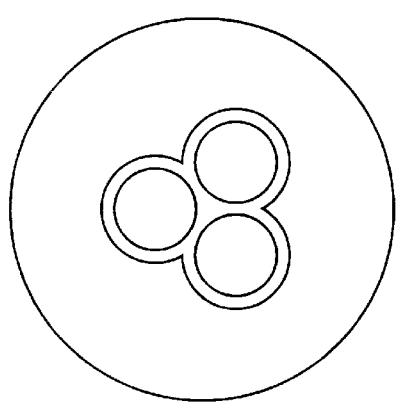
FIG. 3b shows an end view of a sleeve according to the invention having a bore for retaining three optical fibers in a concentric arrangement.
Figure 3D:
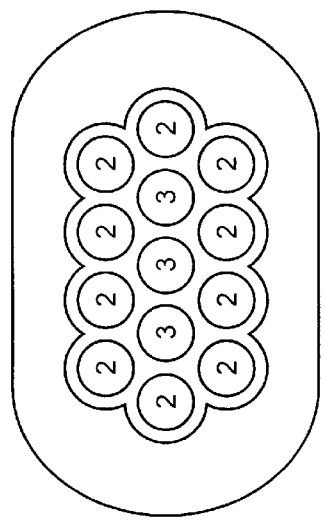
FIG. 3d shows an end view of a sleeve according to the invention having a bore for retaining a plurality of optical fibers in a hexagonal form.
Figure 3A:
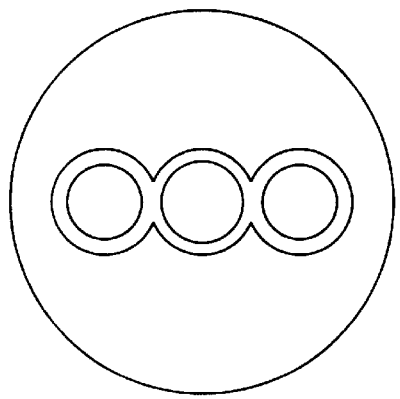
FIG. 3a shows an end view of a sleeve according to the invention having a bore for retaining three linearly arranged optical fibers.
Figure 3C:
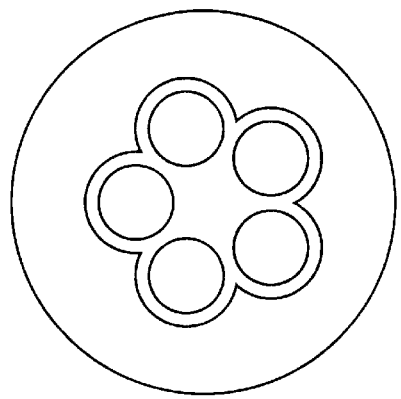
FIG. 3c shows an end view of a sleeve according to the invention having a bore for retaining five optical fibers in a concentric arrangement.

Numerous different arrangements for retaining a plurality of optical fibers within the sleeve according to the invention may be envisaged. FIG. 3a shows a sleeve retaining a plurality in the form of three optical fibers in a linear arrangement. Alternatively the optical fibers are arranged concentrically. FIG. 3b shows a sleeve according to this invention retaining three optical fibers arranged in triangular form and FIG. 3c shows a sleeve according to this invention retaining five optical fibers arranged on a circle. To retain a large plurality of optical fibers the embodiment shown in FIG. 3d arranges the optical fibers in a hexagonal form. Each of the inner optical fibers 3 is surrounded by six neighboring fibers while the outer fibers 2 are surrounded by three or four neighboring fibers and the inner wall of the bore. This embodiment is the most compact solution for a large plurality of optical fibers.

Figure 4:
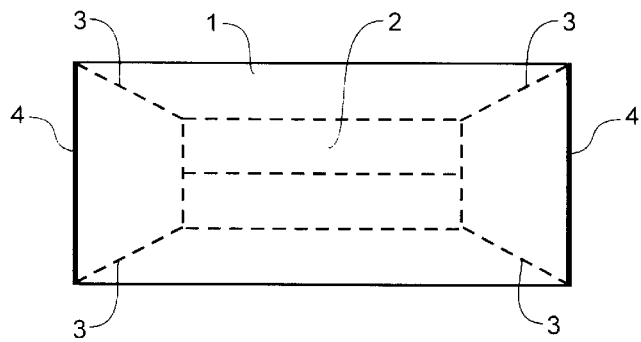
FIG. 4 shows a side view of a sleeve according to the invention having a bore comprising a middle portion and second portions with the walls sloping outwardly from the middle portion.

Another embodiment of a sleeve for retaining a plurality of optical fibers according to this invention is shown in FIG. 4. The bore of the sleeve 1 comprises a middle portion 2 for conforming to the outer surface of the fibers and second portions having one or more walls 3 sloping outwardly from the middle portion of the bore and forming a broader bore end 4 for inserting the fibers into the sleeve. Alternatively this sloping outwardly portion can be provided on a single end.

Figure 5A:
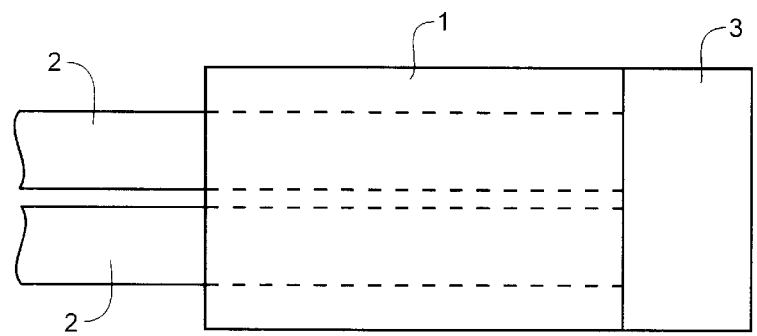
FIG. 5a shows a side view of a sleeve according to this invention used as a housing to build a coupler retaining two optical fibers.
Figure 5B:
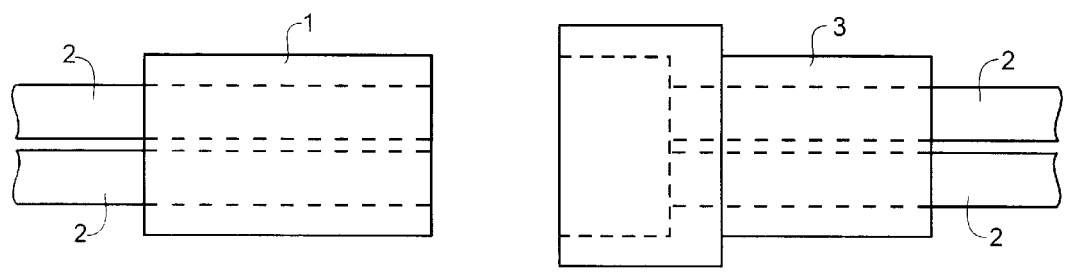
FIG. 5b shows a side view of two sleeves according to this invention used as the male and female part of a coupler according to the invention retaining two optical fibers.

Numerous applications depend on sleeves for retaining a plurality of optical fibers in a close or contacting relationship. These applications require sleeves that prevent the optical fibers from sagging or crossing over. Maintaining the quality of the signal of light transmitted through the optical fibers is also of primary importance. The sleeve according to this invention provides the means for retaining a plurality of optical fibers while meeting all of the above requirements. In another embodiment as shown in FIG. 5a a sleeve according to this invention is used as a housing to build a coupler for retaining the ends of two optical fibers 2 in optical communication with a lens 3. FIG. 5b shows a connector comprising two separate sleeves, each retaining two optical fibers 2. One sleeve forms a male connector 1, which cooperates with a female connector 3 for aligning the fiber ends.

In all the embodiments shown above some of the optical fibers can be replaced by spacer fibers, e.g. to separate optical fibers, using a sleeve designed for retaining more fibers than required.

A sleeve according to this invention is also advantageous when used for the process of heating the sleeve and collapsing it onto the optical fibers. For this process the sleeve consists of a material that has essentially the same coefficient of expansion as the optical fibers.

Figure 6A:
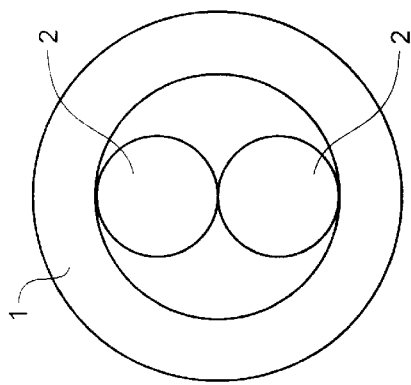
FIG. 6a shows an end view of a sleeve according to the prior art having a bore with a circular cross section retaining a pair of optical fibers.
Figure 6B:
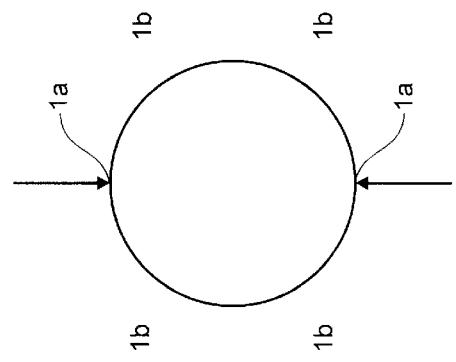

Referring to FIG. 6a a sleeve 1 according to the prior art for retaining two optical fibers 2 and having a circular bore is shown. When this prior art sleeve is heated to collapse and seal the fibers, the subsequent cooling process causes the sleeve 1 to shrink irregularly about the fibers 2 due to the unequal distribution of material within the sleeve 1. This leads to a substantially large compressive stress, indicated by the arrows, acting on the surface of the fibers at the locations 1a, as shown for one optical fiber in FIG. 6b. At the remaining locations 1b no stress is acting on the surface of the optical fiber. This unequal distribution of stress acting on the surface of the fiber de-enhances substantially the signals transmitted through the fiber.

Figure 7A:
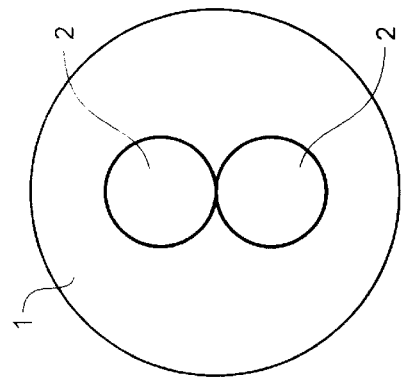
FIG. 7a shows an end view of a sleeve according to the invention for retaining a pair of contacting optical fibers.
Figure 7B:
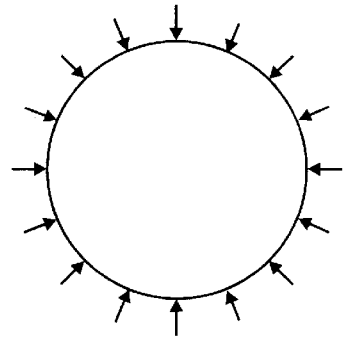

In FIG. 7a a sleeve 1 according to the invention for retaining a plurality in the form of two optical fibers 2 is shown. The optical fibers fit snugly into the bore, each at its predetermined position. Therefore, the inner surface of the bore retains the fibers in their position during the process of collapsing and prevents them from sagging or crossing over. After collapsing the sleeve onto the optical fibers, the inner walls of the bore are contacting substantially the complete surface of the fibers, as shown in FIG. 7a. This results in a substantially equal distribution of compressive stress acting on the surface of the optical fibers, as shown in FIG. 7b.

The sleeve according to this invention is manufactured using methods known in the prior art such as drawing it about a form or laser cutting the inside surface. Numerous other embodiments of the invention may be envisioned without departing from the spirit or scope of the invention.

What is claimed is:

1. A sleeve having a bore retaining a plurality of optical fibers, the bore cross section comprising at least two portions, each portion having an arced wall section and a non-walled section substantially defining a circle, each circle having a radius that is less than a diameter of a fiber of the plurality of fibers such that each portion is dimensioned for containing one fiber and wherein the non-walled sections are overlapping.

2. A sleeve as defined in claim 1 wherein the portions are linearly arranged.

3. A sleeve as defined in claim 1 wherein the portions are concentrically arranged.

4. A sleeve having a bore defined by one or more inner walls for retaining a plurality of optical fibers held in place by an adhesive material, such that at least a portion of the bore for containing the adhesive material conforms to an external surface of the plurality of optical fibers when contained within the sleeve, and wherein the bore conforms to substantially most of the external surface of the plurality of optical fibers within the sleeve.

5. A sleeve as defined in claim 4 wherein the external surface defines a perimeter about the plurality of fibers and wherein the bore conforms to the perimeter.

6. A sleeve having a bore defined by one or more inner walls for retaining a plurality of optical fibers held in place by an adhesive material, such that at least a portion of the bore for containing the adhesive material conforms to an external surface of the plurality of optical fibers when contained within the sleeve, wherein the sleeve is for retaining two fibers in contact with each other.

7. A sleeve as defined in claim 6 wherein a cross-section of the one or more walls through the sleeve perpendicular to a longitudinal axis thereof defines a shape of an outline of a figure eight.

8. A sleeve having a bore defined by one or more inner walls for retaining a plurality of optical fibers held in place by an adhesive material, such that at least a portion of the bore for containing the adhesive material conforms to an external surface of the plurality of optical fibers when contained within the sleeve, wherein the portion of the bore conforms to a plurality of contacting fibers having some cladding removed therefrom for enabling transmission of light from one fiber of the plurality of contacting fibers to another fiber of the plurality of contacting fibers.

* * * * *